(12) United States Patent
Pitt

(10) Patent No.: US 11,781,584 B2
(45) Date of Patent: Oct. 10, 2023

(54) SINGLE SIDE ACCESS SHEET METAL NUT

(71) Applicant: ILLINOIS TOOL WORKS INC., Glenview, IL (US)

(72) Inventor: Clinton Pitt, Portland, TN (US)

(73) Assignee: Illinois Tool Works Inc., Glenview, IL (US)

( * ) Notice: Subject to any disclaimer, the term of this patent is extended or adjusted under 35 U.S.C. 154(b) by 398 days.

(21) Appl. No.: 17/022,787

(22) Filed: Sep. 16, 2020

(65) Prior Publication Data

US 2021/0115960 A1    Apr. 22, 2021

Related U.S. Application Data

(60) Provisional application No. 62/924,371, filed on Oct. 22, 2019.

(51) Int. Cl.
*F16B 37/04* (2006.01)

(52) U.S. Cl.
CPC .................................. *F16B 37/041* (2013.01)

(58) Field of Classification Search
CPC .............................. F16B 37/043; F16B 37/02
USPC .......................................... 411/173, 174, 970
See application file for complete search history.

(56) References Cited

U.S. PATENT DOCUMENTS

| | | | | |
|---|---|---|---|---|
| 2,258,845 A * | 10/1941 | Burke | ................... | F16B 37/041 411/970 |
| 2,315,359 A * | 3/1943 | Tinnerman | ............ | F16B 37/041 411/103 |
| 2,382,942 A * | 8/1945 | Murphy | ................. | F16B 37/065 411/174 |
| 2,426,799 A * | 9/1947 | Tinnerman | ............ | F16B 37/043 411/173 |
| 2,562,002 A * | 7/1951 | Tinnerman | ............ | F16B 37/041 411/173 |
| 2,654,411 A * | 10/1953 | Bedford, Jr. | ............ | F16B 35/06 411/970 |
| 2,683,577 A * | 7/1954 | Flora | ....................... | F16B 9/054 403/243 |
| 2,745,458 A * | 5/1956 | Bedford, Jr. | .......... | F16B 37/041 411/173 |
| 2,781,073 A | 2/1957 | Trafton | | |
| 3,229,743 A | 1/1966 | Derby | | |
| 3,450,317 A | 6/1969 | Ramer | | |

(Continued)

FOREIGN PATENT DOCUMENTS

EP    1336763 A2    8/2003

OTHER PUBLICATIONS

Search Report, related EP Application No. 20197921.8, dated Mar. 4, 2021, 8 pages.

*Primary Examiner* — Flemming Saether
(74) *Attorney, Agent, or Firm* — Quarles & Brady LLP

(57) ABSTRACT

A sheet metal nut includes a base having a flat planar surface. The sheet metal nut also has a sleeve that extends below the base and includes an inner surface. The sheet metal nut further includes at least two front flanges and at least one rear flange. The at least two front flanges are positioned on an edge of the base and extend to a position directly above the flat planar surface of the base. The at least one rear flange extends away from a rear surface of the base. The sheet metal nut is configured to securely fasten to a bottom side of a component through a single aperture when the bottom side of the component is restricted or inaccessible.

13 Claims, 13 Drawing Sheets

(56) References Cited

U.S. PATENT DOCUMENTS

| | | | |
|---|---|---|---|
| 3,927,707 A * | 12/1975 | Wright | F16B 37/041 |
| | | | 411/174 |
| D264,789 S | 6/1982 | Zyla et al. | |
| D296,046 S | 6/1988 | Marshall | |
| 4,823,962 A | 4/1989 | Arias | |
| 4,880,200 A | 11/1989 | Champagne et al. | |
| 5,248,072 A | 9/1993 | Jones | |
| 5,413,301 A | 5/1995 | Cadman | |
| 5,423,646 A * | 6/1995 | Gagnon | F16B 37/041 |
| | | | 411/184 |
| 5,713,707 A * | 2/1998 | Gagnon | F16B 37/041 |
| | | | 411/524 |
| D533,362 S | 12/2006 | Giampavolo | |
| D593,757 S | 6/2009 | Barker et al. | |
| D792,922 S | 7/2017 | Benson | |
| D802,402 S | 11/2017 | Hintze | |
| D822,464 S | 7/2018 | Kwiatkowski et al. | |
| 10,197,217 B2 | 2/2019 | Will et al. | |
| D878,186 S | 3/2020 | Toye | |
| D899,234 S | 10/2020 | Chen | |
| D904,865 S | 12/2020 | Buczynski | |
| D913,499 S | 3/2021 | Hwang | |
| 2005/0144763 A1 | 7/2005 | Boville | |
| 2005/0220563 A1 | 10/2005 | Kosidlo et al. | |
| 2011/0107714 A1 | 5/2011 | Kodi | |
| 2015/0122856 A1 | 5/2015 | Pecotte et al. | |

\* cited by examiner

SINGLE SIDE ACCESS SHEET METAL NUT

CROSS REFERENCE TO RELATED APPLICATIONS

This application is based on, claims priority to, and incorporates herein by reference in its entirety U.S. Provisional Application No. 62/924,371, filed on Oct. 22, 2019, and entitled "SINGLE SIDE ACCESS SHEET METAL NUT".

BACKGROUND OF THE INVENTION

1. Field of the Invention

The present invention relates generally to fastening nuts and, more particularly, to a nut that is capable of being assembled with a fastener to a panel with only one hole in the panel.

2. Description of the Background of the Invention

Various vehicles include a panel that covers and protects components and structures. The panel is secured to a frame of the vehicle. Typically, fasteners and nuts are used to secure the panel to the frame. For example, bolts and fastening nuts may be used to secure a fender to a sub frame. The bolt is inserted from one side of the panel, while the nut is on the bottom surface of the panel. However, this process can be difficult when a user does not have access to the bottom surface of the panel. As can be appreciated, the process of positioning and aligning bolts and nuts with respect to the panel and frame of a vehicle is time and labor intensive.

When access to the bottom surface of the panel is inhibited, current products in the market require multiple holes to be pierced/punched into the panel. Further, many prior art fastening nuts require specialized assembly equipment to reach the bottom surface of the panel when access is limited. Furthermore, many prior art fastening nuts are unable to meet the required proof load.

A need therefore exists for a nut with increased functionality such that the nut is able to be assembled to a panel with only one hole punched in the panel, when access to the bottom surface of the panel is restricted.

SUMMARY OF THE INVENTION

In one aspect, a sheet metal nut comprises a base that includes a flat planar surface. The sheet metal nut also comprises a sleeve that extends below the base and comprises an inner surface. The sheet metal nut further includes at least two front flanges and at least one rear flange. The at least two front flanges are positioned on an edge of the base and extend to a position directly above the flat planar surface of the base. The at least one rear flange extends away from a rear surface of the base. The sheet metal nut is configured to securely fasten to a bottom side of a component through a single aperture when the bottom side of the component is restricted or inaccessible.

In some embodiments, the at least one rear flange is positioned between the at least two front flanges. A first portion of the at least one rear flange extends below the flat planar surface of the base, and a second portion of the at least one rear flange extends above the flat planar surface of the base. In other embodiments, the at least two front flanges are identical. In further embodiments, the at least two front flanges and the at least one rear flange are capable of deflecting. In some embodiments, the sleeve comprises a hole that extends therethrough. The sleeve further comprises a chamfered edge that extends near the flat planar surface. In other embodiments, the at least one rear flange is wider than each of the at least two front flanges.

In another aspect, a sheet metal nut comprises a base that includes a flat planar surface. The sheet metal nut also comprises a sleeve that extends downwardly from a center portion of the base. The sleeve is defined by an inner surface of a wall that is cylindrical. The sheet metal nut further comprises a plurality of flanges that extend from a rear surface of the base. The plurality of flanges are flexible components that are capable of flexing during installation of the sheet metal nut. The sheet metal nut is configured to allow two or more components to be fastened together when access to a bottom surface of one of the components is restricted or inaccessible.

In some embodiments, at least one of the plurality of flanges extends to a position over the flat planar surface of the base. At least one of the plurality of flanges extends away from the rear surface of the base and comprises a portion that extends below the flat planar surface of the base. In other embodiments, the base and at least one of the plurality of flanges comprises a plurality of cutouts. In further embodiments, the sleeve comprises a chamfered edge that extends near the flat planar surface of the base. The sleeve comprises a cone draw style chamfer.

In yet another aspect, a fastening system comprises a sheet metal nut and a first component. The sheet metal nut includes a base and a sleeve. The base includes a flat planar surface, and the sleeve extends downwardly from a center portion of the base. The sleeve further comprises a hole that extends therethrough. The sheet metal nut also comprises at least one front flange and a rear flange. The at least one front flange extends from a rear surface of the base, and the at least one front flange extends to a position over the flat planar surface of the base. The rear flange extends from the rear surface of the base, and a portion of the rear flange extends below the flat planar surface of the base. The first component comprises an aperture that extends through the first component. The aperture is T-shaped. The sheet metal nut is configured to securely fasten to a bottom side of the first component through the aperture when the bottom side of the first component is restricted or inaccessible.

In some embodiments, the at least one front flange and the rear flange comprise a point of contact with the first component in an installed position. In other embodiments, the fastening system further comprises a second component that includes a rounded aperture. The second component is placed over the first component. The rounded aperture of the second component, the aperture of the first component, and the hole of the sleeve are aligned in an installed position. The fastening system further comprises a fastener. The fastener is configured to extend through the first component, the second component, and a portion of the sleeve.

Figure 1:
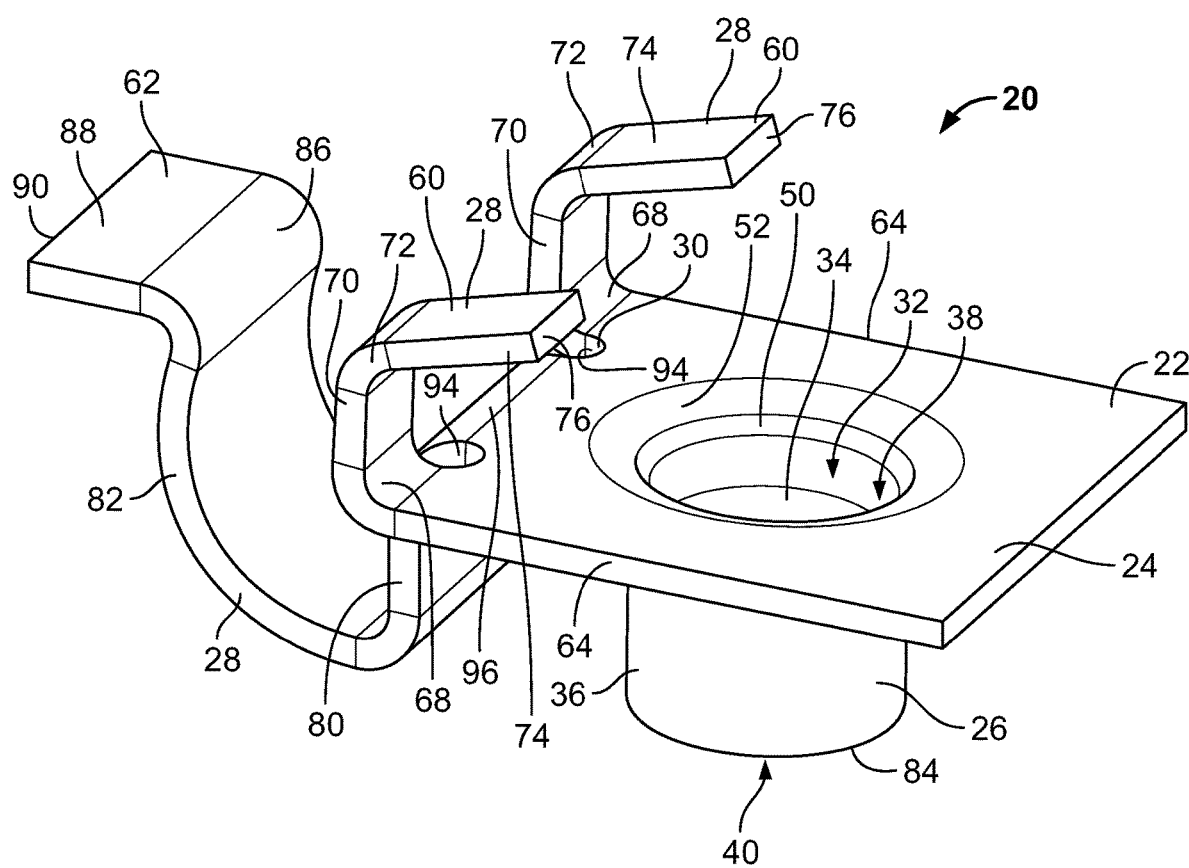
FIG. 1 is a top isometric view of a nut, according to one embodiment.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Throughout the disclosure, the terms "about" and "approximately" mean plus or minus 5% of the number that each term precedes.

DETAILED DESCRIPTION OF THE DRAWINGS

Embodiments of the present disclosure provide for a nut and a specialized aperture that are used to secure two component together when access to the rear surface of one of the components is limited or non-accessible. Specifically, the nut is inserted into the aperture of the component in a vertical direction, and the nut is then rotated to be secured to the component. The features described herein allow for the nut to only require one hole in the component and to be inserted on the surface accessible to a user.

Figure 2:
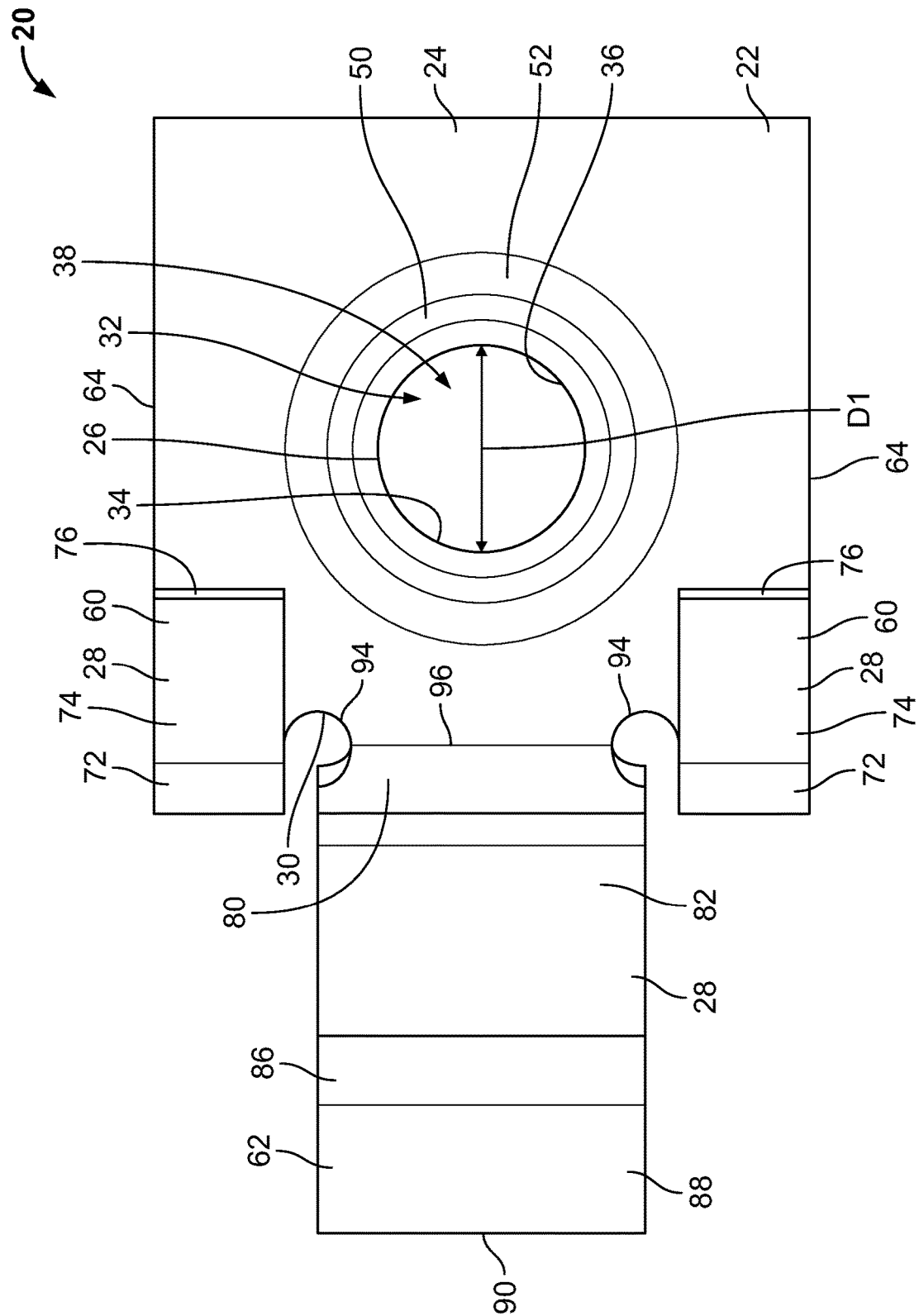
FIG. 2 is a top plan view of the nut of FIG. 1.

FIGS. 1-6 illustrate a sheet metal nut 20 in accordance with the present disclosure. In the present embodiment, the nut 20 may be integrally molded or formed as a single piece of material, such as through known forming or molding operations. In preferred embodiments, the nut 20 is formed of metal, however, in alternative embodiments, the nut 20 may be formed of plastic. With reference to FIGS. 1 and 2, an isometric view and a top plan view of the nut 20 are shown, respectively. As illustrated in FIGS. 1 and 2, the nut 20 comprises a base 22 that is generally rectangular and includes a flat planar surface 24. In alternative embodiments, the base 22 may comprise any type of shape and is not limited to being rectangular. For example, the base 22 of the nut 20 can comprise any type of polygonal shape, e.g., triangular, square, hexagonal, etc., or may be rounded and comprise a generally circular profile. Further, a sleeve 26 extends downwardly from a center portion of the base 22, and a plurality of legs or flanges 28 extend from a rear edge 30 of the base 22.

Referring still to FIGS. 1 and 2, the sleeve 26 extends below the base 22 and comprises a hole 32 extending therethrough. The sleeve 26 is defined by an inner surface 34 of a wall 36 that is generally cylindrical. In some embodiments, the wall 36 may be tapered. The wall 36 extends between an upper opening 38 and a lower opening 40 of the sleeve 26 (see FIG. 1). In alterative embodiments, the wall 36 may extend downwardly at a different length than shown. As illustrated in FIGS. 1 and 2, the inner surface 34 of the wall 36 comprises a smooth, uninterrupted profile. However, in other embodiments, the inner surface 34 of the wall 36 may comprise a plurality of threading. It is contemplated that the inner surface 34 of the wall 36 may comprise any type of threading therein. In one embodiment, the inner surface 34 may comprise abrupt threading such that the chance of cross threading can be reduced.

Referring still to FIGS. 1 and 2, the upper opening 38 of the sleeve 26 comprises a chamfered edge 50 that extends near the flat planar surface 24 of the base 22 into the sleeve 26. The chamfered edge 50 may comprise a cone draw style chamfer; however, any style chamfer may be used for the chamfered edge 50. Further, the sleeve 26 includes a rounded edge 52 adjacent to the chamfered edge 50 that joins the sleeve 26 to the base 22. As illustrated in FIG. 2, the hole 32 that extends through the sleeve 26 comprises a diameter D1. In preferred embodiments, the diameter D1 can have a range of 6.0 mm-8.0 mm. However, in alternative embodiments, the diameter D1 can be any size. Additionally, in other embodiments, the nut 20 may include more than one sleeve 26 extending downwardly from the base 22. In preferred embodiments, the sleeve 26 is located at the center of the base 22, however, in some embodiments, the sleeve 26 may not be centered with respect to the base 22.

Figure 3:
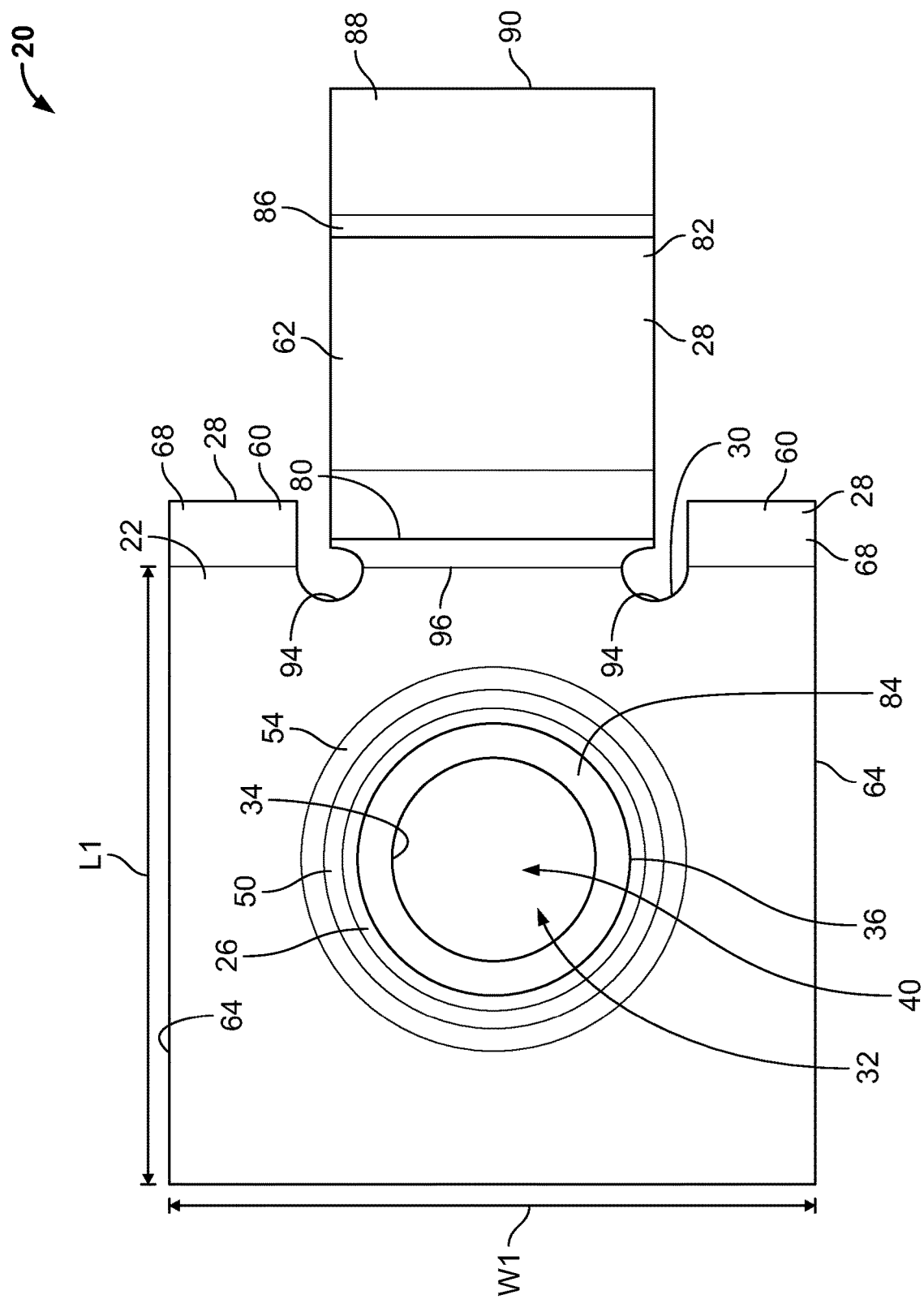
FIG. 3 is a bottom plan view of the nut of FIG. 1.
Figure 4:
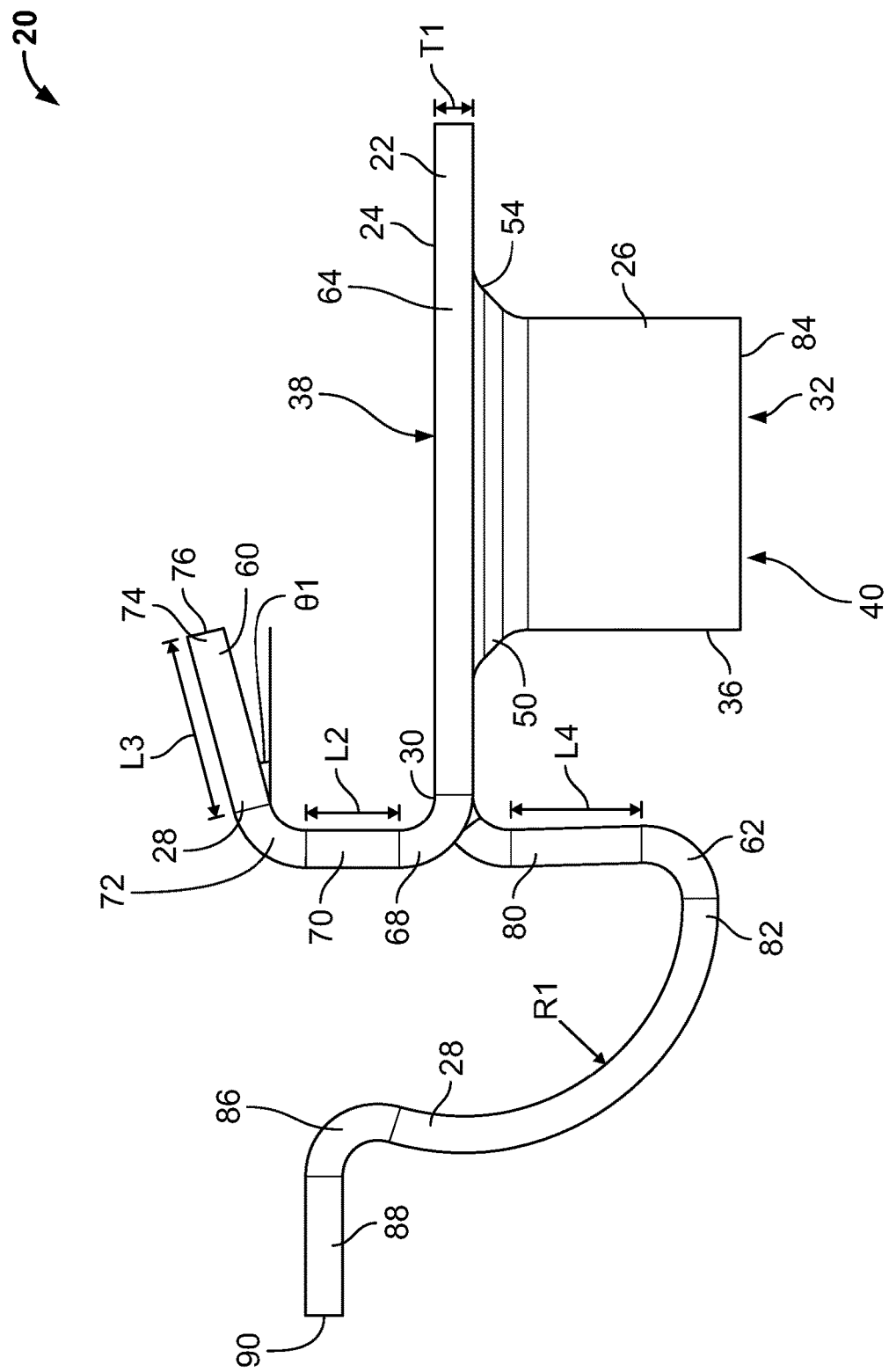
FIG. 4 is a right side elevational view of the nut of FIG. 1.

Referring to FIGS. 3 and 4, a bottom view and a side view of the nut 20 are shown, respectively. As illustrated in FIG. 3, the lower opening 40 is shown more clearly and an underside of the base 22 is illustrated. The sleeve 26 extends outwardly from the base 22 and comprises a fillet 54 that joins the sleeve 26 to the base 22. The fillet 54 is located between the chamfered edge 50 of the sleeve 26 and the base 22. As noted herein, the base 22 of the nut 20 comprises a width W1 and a length L1. In preferred embodiments, the width W1 of the base 22 can have a range of 19.0 mm-20.0 mm and the length L1 of the base 22 can have a range of 19.0 mm-20.0 mm. However, in alternative embodiments, the width W1 and length L1 of the base 22 can be any size or comprise any length. Further, the base 22 of the nut 20 comprises a thickness T1. In preferred embodiments, the thickness T1 of the base 22 can have a range of 0.8 mm-1.2 mm. However, in alternative embodiments, the thickness T1 of the base 22 can comprise any length.

Referring back to FIGS. 1, the flanges 28 of the nut 20 are shown more clearly. As discussed above, the flanges 28 extend from and are positioned on the rear edge 30 of the base 22, and the flanges 28 protrude in multiple directions. Further, the flanges 28 are flexible components that may bend or flex during installation, i.e., the flanges 28 are capable of deflecting. Furthermore, the flanges 28 comprise a generally rectangular cross-sectional area. In the present embodiment, the flanges 28 are made up of two front flanges 60 and a rear flange 62. The front flanges 60 extend to a position directly above the flat planar surface 24 of the base 22. Alternatively, the rear flange 62 extends away from the rear edge 30 of the base 22 and is positioned between the two front flanges 60. In alternative embodiments, the nut 20 may include a greater or fewer number of front flanges 60. Additionally, the nut 20 may include multiple rear flanges 62. As will be discussed below, the two front flanges 60 are identical and only one of the front flanges 60 will be described hereinafter for ease of description.

Referring still to FIG. 1, the flanges 28 may extend from only one side of the base 22 or flat planar surface 24. In alternative embodiments, the flanges 28 may extend from multiple sides of the base 22. Referring to FIG. 4, a side view of one of the front flanges 60 and the rear flange 62 can be shown. The front flange 60 is positioned on the edge of the base 22, such that a portion of the front flange 60 is collinear with side edges 64 of the base 22 (see FIG. 1). Further, as illustrated in FIGS. 1 and 2 and as discussed above, the front flanges 60 extend to a position that is over the flat planar surface 24 and to the side of the sleeve 26.

Referring to FIGS. 1 and 4, each of the front flanges 60 initially extend outwardly from the base 22 and comprise a first curved wall 66. The first curve wall 68 transitions into a vertical wall 70 that is perpendicular to the base 22 or flat planar surface 24. In alternative embodiments, the vertical wall 70 may be angled with respect to the base 22. The vertical wall 70 extends upwardly toward a second curved wall 72 that may comprise a greater radius than the first curved wall 68. However, in alternative embodiments, the first curved wall 68 may define a greater or equal radius compared to the second curved wall 72. The second curved wall 72 terminates at an angled wall 74. The angled wall 74 extends upwardly at an angle away from the base 22 or flat planar surface 24 and comprises an end 76 of the front flanges 60. As noted herein, the vertical wall 70 is defined by a length L2 and the angled wall 74 is defined by a length L3. In some embodiments, the front flanges 60 may comprise additional components that further extend above and/or along the base 22 and the flat planar surface 24 of the nut 20.

In preferred embodiments, the length L2 of the vertical wall 70 may have a range of 1.5 mm-3.0 mm. Further, the length L3 of the angled wall 74 may have a range of 4.0 mm-5.0 mm. However, in alternative embodiments, the length L2 of the vertical wall 70 and the length L3 of the angled wall 74 may comprise any length. As illustrated in FIG. 4, the angled wall 74 extends at an angle θ1. In preferred embodiments, the angle θ1 may be 15°. However, in alternative embodiments, the angle θ1 may comprise any angle. For example, depending on the operation of the nut 20, the angle θ1 may be larger or smaller than shown. In some embodiments, the angled wall 74 may extend downwardly at an angle toward the base 22. In additional embodiments, the length and width of the front flanges 60 may be adjusted depending on the operation being performed. As such, the length and width of the first curved wall 68, the vertical wall 70, the second curved wall 72, and the angled wall 74 may be adjusted to contain a greater or smaller straight line distance. Therefore, the length and width of all of the components of the front flange 60 may be adjusted in order for the entire front flange 60 to comprise a greater or smaller surface area than shown. Further, the first curved wall 68 and the second curved wall 72 may define a greater or smaller radius than illustrated.

Referring back to FIGS. 1 and 4, the rear flange 62 is illustrated extending away from the base 22 of the nut 20. As illustrated in FIG. 4, the rear flange 62 initially extends below the base 22 or flat planar surface 24 by way of a splined wall 80. The splined wall 80 comprises a generally S-type configuration and extends below the base 22 or flat planar surface 24 to a first arched wall 82. The splined wall 80 further comprises a length L4 that extends downwardly from the base 22. In preferred embodiments, the length L4 may have a range of 2.0 mm-4.0 mm. However, in alternative embodiments, the length L4 may comprise any length.

Referring still to FIGS. 1 and 4, the first arched wall 82 defines a generally rounded surface that extends upwardly from the splined wall 80. In particular, the first arched wall 82 extends from a position in line with a bottom 84 of the sleeve 26 to a position above the flat planar surface 24 of the base 22 of the nut 20. Put differently, a first portion of the rear flange 62 extends below the flat planar surface 24 of the base 22 and a second portion of the rear flange 62 extends above the flat planar surface 24 of the base 22. As will be discussed in further detail herein, the first arched wall 82 is configured to assist a user during installation of the nut 20. In particular, the first arched wall 82 is flexible and able to bias the nut 20 into the installed position. As noted herein, the first arched wall 82 comprises a radius R1. In preferred embodiments, the radius R1 may have a range of 6.0 mm-8.0 mm. However, in alternative embodiments, the radius R1 of the first arched wall 82 may comprise any length. For example, depending on the operation of the nut 20, the radius R1 can be larger or smaller than shown.

Referring still to FIGS. 1 and 4, the first arched wall 82 terminates at a second arched wall 86 that curves away from the base 22. The second arched wall 86 is connected with a finger 88 that extends away from the base 22. As illustrated in FIG. 4, the finger 88 is parallel with the flat planar surface 24 of the base 22. However, in alternative embodiments, the finger 88 may be angled with respect to the base 22 and may not be parallel with the flat planar surface 24 of the base 22. In such an embodiment, the second arched wall 86 may comprise a different radius than shown such that the finger 88 may be angled. As noted herein, the finger 88 comprises an end 90 of the rear flange 62. In preferred embodiments, the first arched wall 82, the second arched wall 86, and the finger 88 comprise a generally S-type configuration (see FIG. 4).

Referring to FIG. 4, the rear flange 62 extends to a position significantly away from the base 22. However, in alternative embodiments, the rear flange 62 may extend farther from or closer to the rear edge 30 of the base 22, such that the length R1 of the first arched wall 82 may comprise a length greater or smaller than that shown. Additionally, in other embodiments, the length L4 of the splined wall 80 may be altered such that it may extend downward from the base 22 at a greater or smaller distance. Further, the finger 88 may extend from the second arched wall 86 a greater or smaller length than illustrated. As such, the length and width of all of the components of the rear flange 62 may be adjusted in order for the entire rear flange 62 to comprise a greater or smaller surface area than illustrated. Further, the splined wall 80, the first arched wall 82, and the second arched wall 86 may define a greater or smaller radius than shown. Additionally, in alternative embodiments, the front flanges 60 and the rear flange 62 may comprise a greater or smaller thickness than illustrated.

Referring back to FIG. 2, the rear flange 62 and the base 22 of the nut 20 comprise cutouts 94. The cutouts 94 extend into the base 22 and on opposite sides of the rear flange 62. As a result of the cutouts 94, the splined wall 80 includes a thinned section 96 that is connected with the base 22 of the nut 20. Therefore, the width of the splined wall 80 increases from its connection with the base 22 of the nut 20. As will be discussed in further detail herein, the cutouts 94 increase the flexibility of the rear flange 62 and allow the rear flange 62 to bend easier while the nut 20 is being installed. In alternative embodiments, the base 22 and the rear flange 62 may not comprise any cutouts 94. Further, in some embodiments, the cutouts 94 may be larger or smaller than illustrated.

Figure 5:
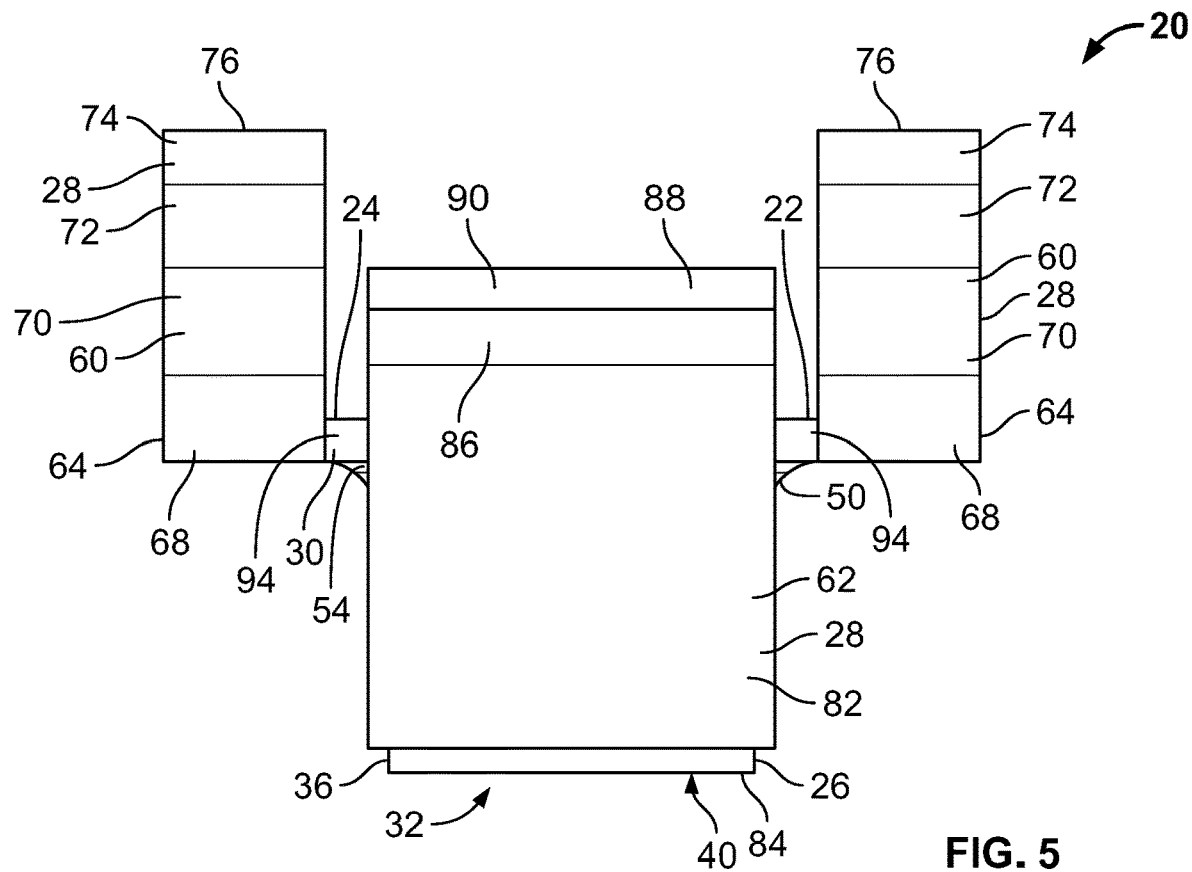
FIG. 5 is a rear elevational view of the nut of FIG. 1.
Figure 6:
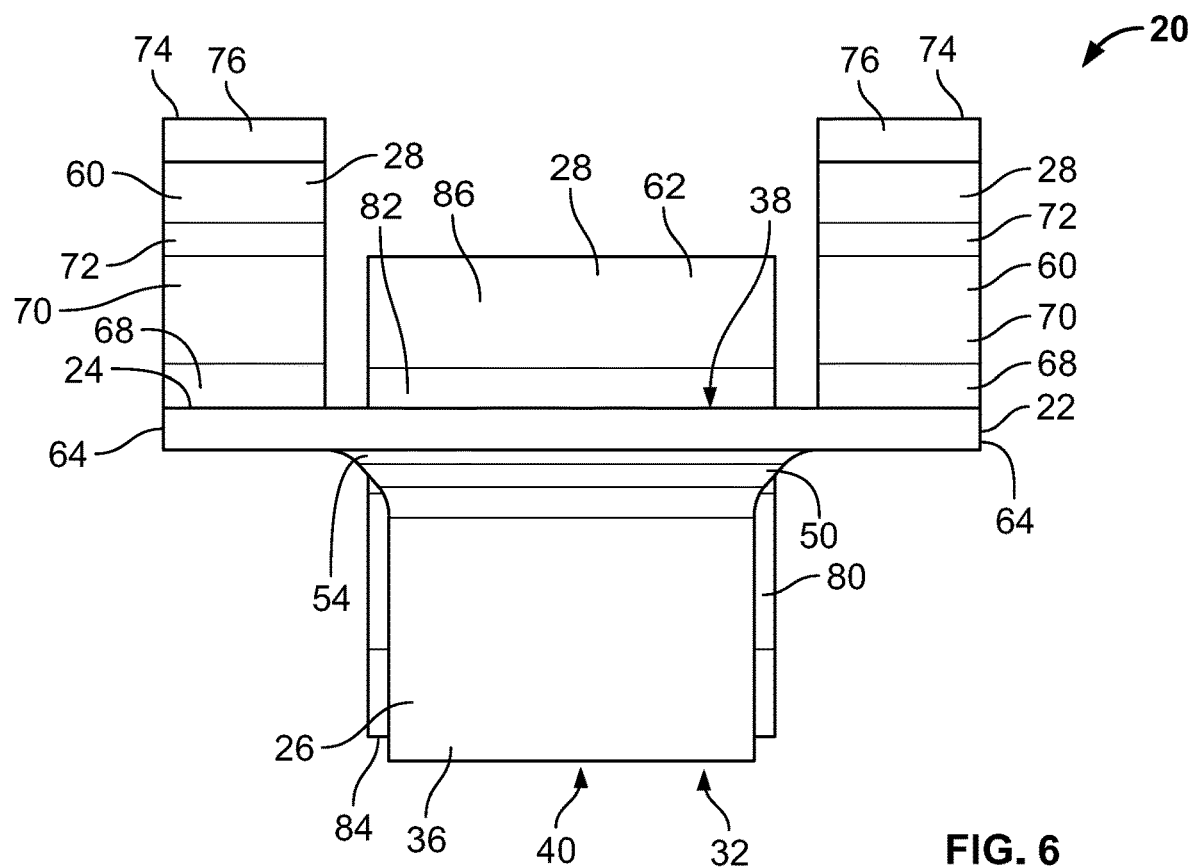
FIG. 6 is a front elevational view of the nut of FIG. 1.

Referring to FIGS. 5 and 6, a rear view and a front view of the nut 20 are shown, respectively. As illustrated in FIG. 5, the vertical wall 70 of the front flanges 60 and the first arched wall 82 of the rear flange 62 are shown. As noted herein, the rear flange 62 is wider than the front flanges 60.

However, in some embodiments, the front flanges 60 may be wider than the rear flange 62 or may comprise the same width as the rear flange 62. Additionally, the sleeve 26 is shown extending below the base 22 to a greater extent than the rear flange 62. With reference to FIG. 6, the front flanges 60 are shown as being collinear with the side edges 64 of the base 22.

Figure 7:
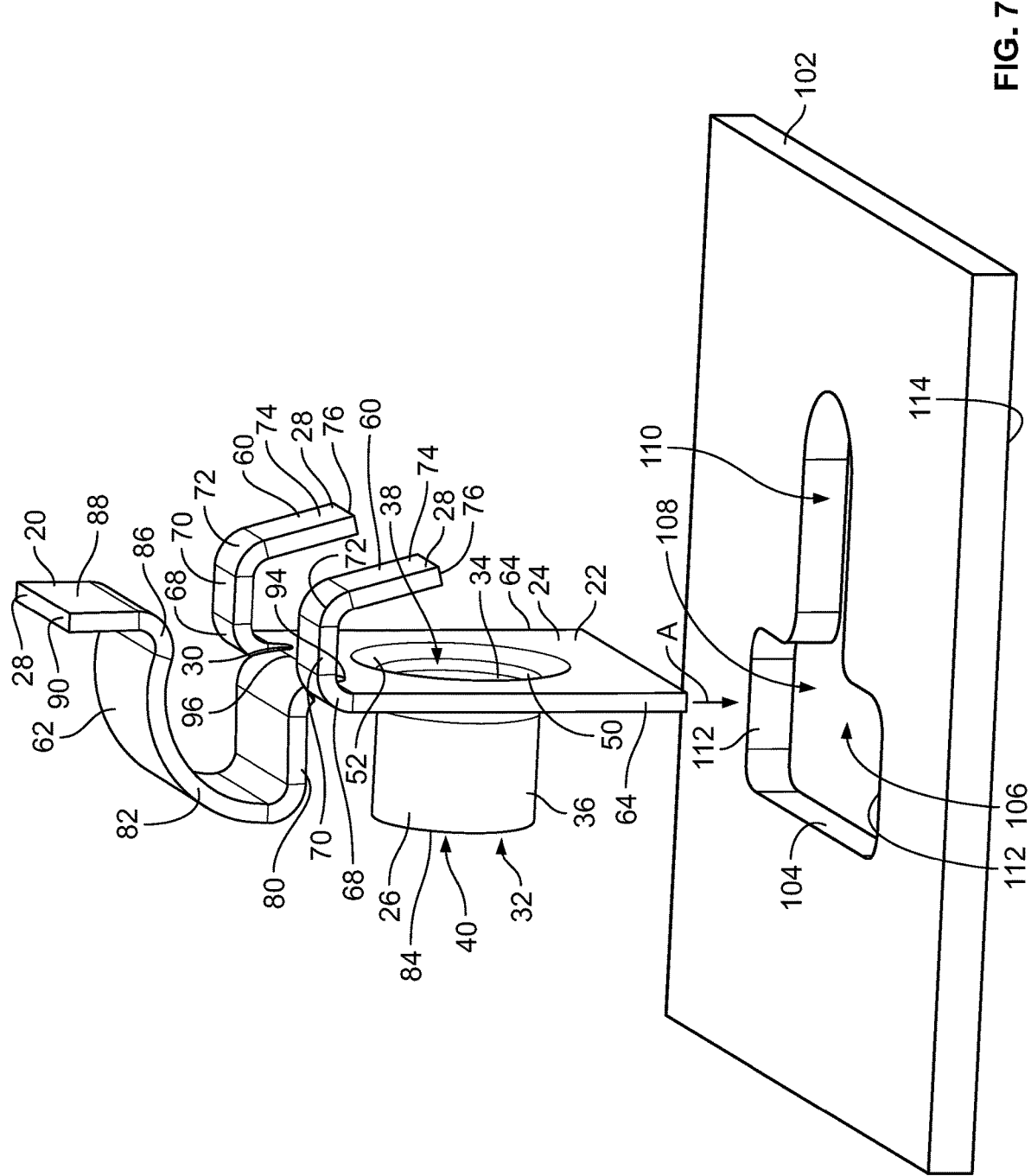
FIG. 7 is an isometric view of the nut of FIG. 1 aligned with a first component.

Referring to FIG. 7, the nut 20 is shown aligned with a first component 102. The first component 102 may include internal edges 104 that define an aperture 106 extending through the first component 102. In preferred embodiments, the aperture 106 is generally T-shaped and extends entirely though the first component 102. However, in alternative embodiments, the aperture 106 may comprise any shape. In one embodiment, the aperture 106 may be shaped like a cross. It is contemplated that the first component 102 may comprise any thickness or configuration. Further, the first component 102 can be any shape, may be larger or smaller than shown, and may comprise any type of panel, such as a plastic panel, an aluminum panel, or a metal panel, for example. As illustrated in FIG. 7, the internal edges 104 are rounded to create the T-shape. In other embodiments, the internal edges 104 may comprise corners that are not rounded.

Referring still to FIG. 7, the aperture 106 comprises a lateral segment 108 aligned with the sleeve 26 and base 22 of the nut 20. The lateral segment 108 is wide enough to allow the base 22 to fit therebetween. Put differently, the lateral segment 108 of the aperture 106 is greater than or equal to the width W1 (see FIG. 3) of the base 22. Further, the aperture 106 includes an elongated slot 110 that extends from the lateral segment 108. The elongated slot 110 extends perpendicular to the lateral segment 108 of the aperture 106. The lateral segment 108 and the elongated slot 110 form the aperture 106 and are configured to allow the nut 20 to be inserted therethrough. As noted herein, the aperture 106 is configured to be the only hole needed to be pierced or punched into the first component 102. Therefore, the user can form the aperture 106 in the first component 102 with ease and does not need to pierce or punch multiple holes/apertures into the first component 102.

Referring still to FIG. 7, the nut 20 is positioned above the first component 102 and positioned in line with the aperture 106. The nut 20 is positioned in a lateral position, perpendicular to the first component 102. When access to the bottom side of the first component 102 is restricted or inaccessible, the user may pierce the single aperture 106 in the first component 102. Once the aperture 106 is formed in the first component 102, the user may align the nut 20 with the first component 102 in such a configuration as shown in FIG. 7. As discussed above, the sleeve 26 of the nut 20 is aligned with the lateral segment 108 of the aperture 106 and the side edges 64 of the base 22 are aligned with distal ends 112 of the lateral segment 108 of the aperture 106. Once aligned, the nut 20 may then be urged into the aperture 106 in the direction of arrow A. Upon urging of the nut 20, the side edges 64 of the base 22 make their way through the lateral segment 108 of the aperture 106, and the sleeve 26 will begin to protrude therethrough (see FIG. 8).

Figure 8:
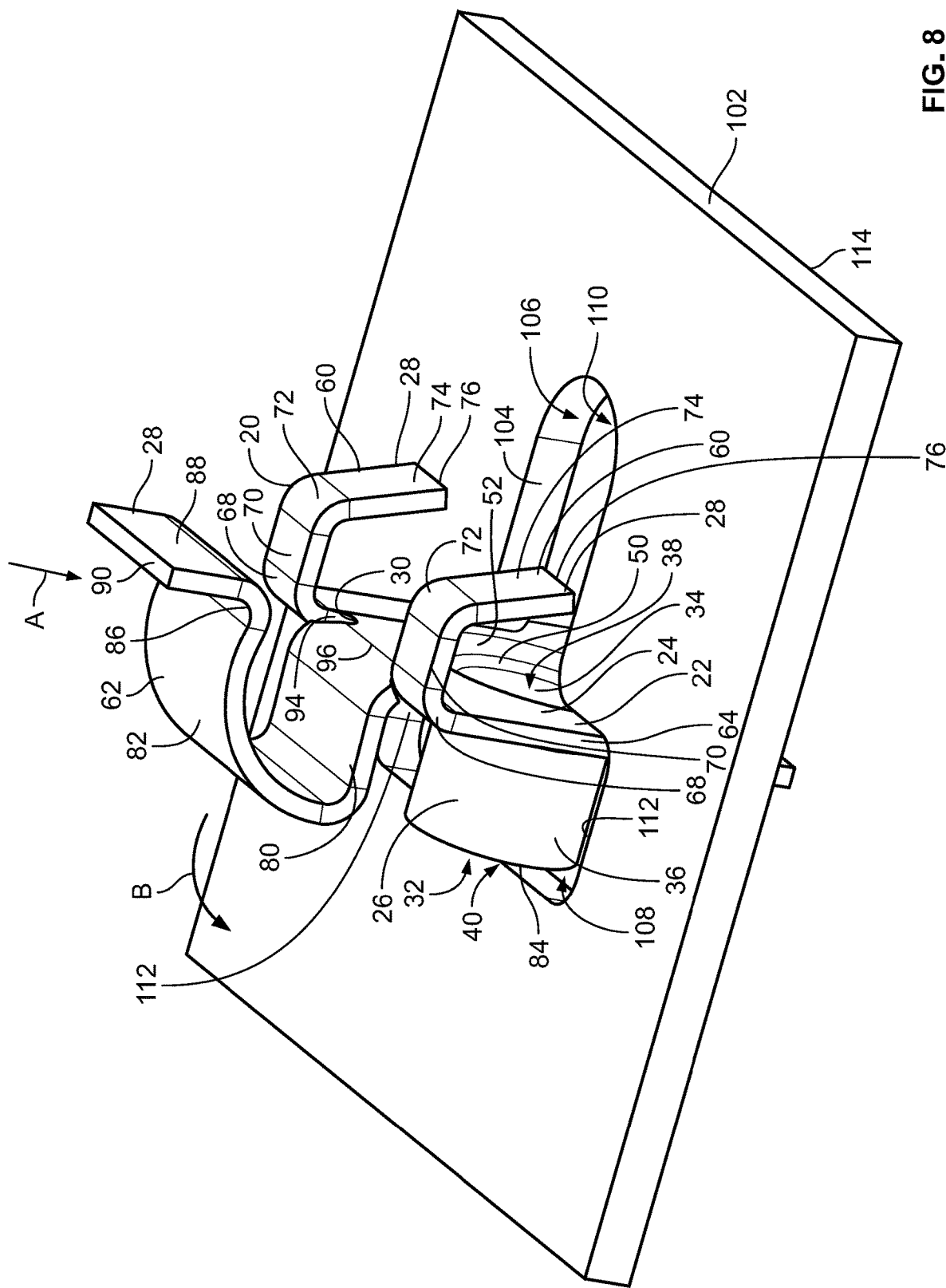
FIG. 8 is a top isometric view of the nut of FIG. 1 partially inserted in the first component.
Figure 9:
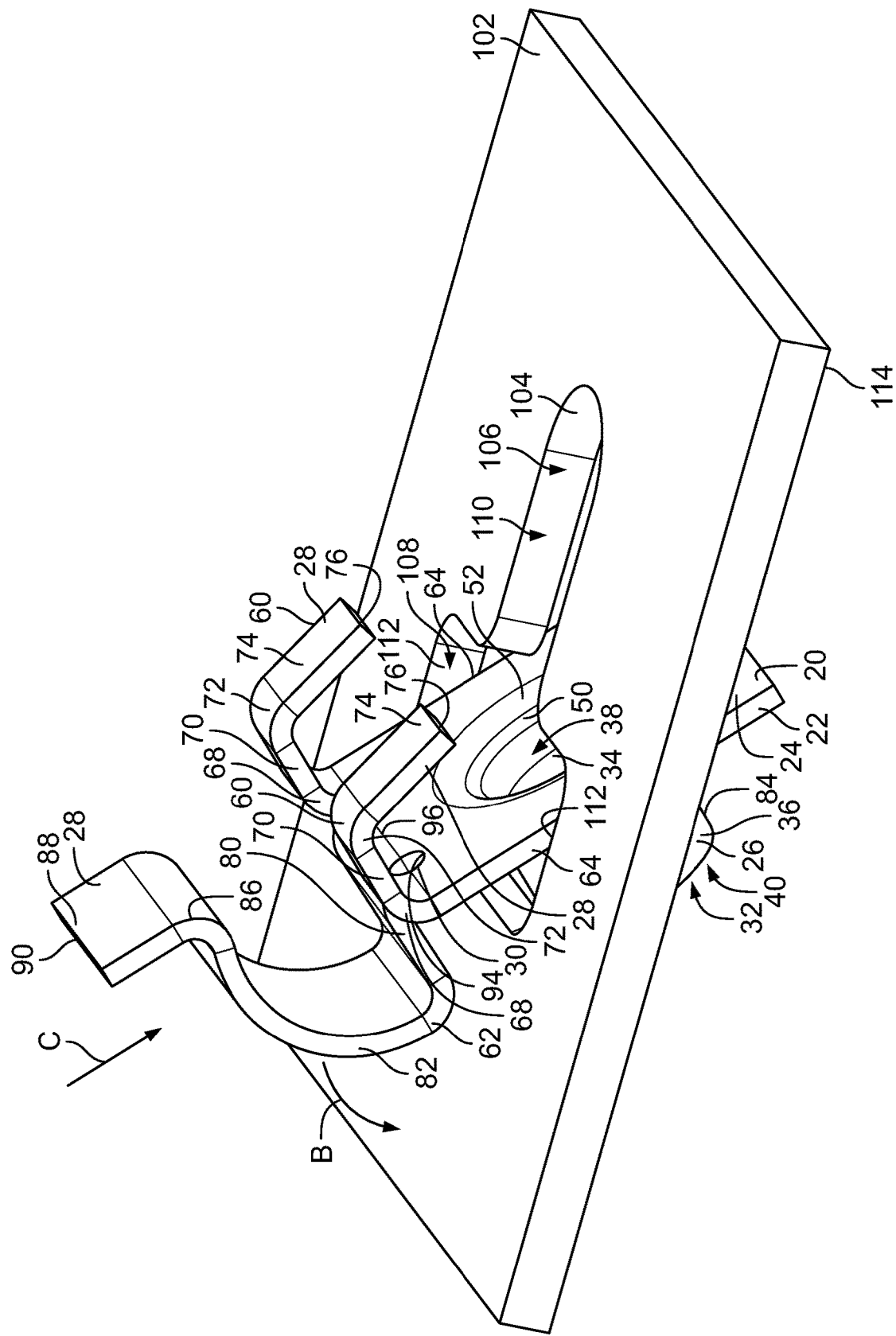
FIG. 9 is a top isometric view of the nut of FIG. 1 partially rotated in the first component.

Referring to FIG. 8, the nut 20 is partially inserted into the aperture 106 of the first component 102. As discussed above, the side edges 64 of the base 22 and the sleeve 26 are extending partially through the lateral segment 108 of the aperture 106. Upon continued urging of the nut 20 in the direction of arrow A, the sleeve 26 may extend fully through the aperture 106. Once the sleeve 26 makes its way through the lateral segment 108 of the aperture 106, the nut 20 can be rotated in the direction of arrow B, i.e., counterclockwise when viewed from FIG. 8. After rotating the nut 20 in the direction of arrow B about 45°, the nut 20 is in a partially installed position, as shown in FIG. 9. In this particular configuration, the base 22 may be in contact with the internal edges 104 of the lateral segment 108 (see FIG. 9). In some embodiments, when the nut 20 is in the partially installed position, a portion of the front flanges 60 may make contact with the first component 102. In such an embodiment, the front flanges 60 may flex outwardly to allow the nut 20 to be rotated into the installed position.

Referring to FIG. 9, the nut 20 is partially rotated in the first component 102. Once the nut 20 is in the partially installed position of FIG. 9, the user may then push the nut 20 in the direction of arrow C and continue to rotate the nut 20 in the direction of arrow B, i.e., counterclockwise when viewed from FIG. 9. As the user continues to push and turn the nut 20, the base 22 and the rear flange 62 will continue to slide along the internal edges 104 of the lateral segment 108 until the first arched wall 82 of the rear flange 62 clears the internal edges 104 of the lateral segment 108. Once the first arched wall 82 clears the internal edges 104 of the lateral segment 108, the nut 20 can slide into the installed position (see FIG. 10). As discussed above, the flanges 28 of the nut 20 are flexible and can bend. Therefore, the first arched wall 82 is designed to flex to allow for easier installation of the nut 20. Further, the shape of the first arched wall 82 helps bias the nut 20 during installation into the installed position. As such, during installation, the first arched wall 82 is capable of deflecting toward the base 22 such that the nut 20 can be easily placed into the installed positon. Furthermore, the cutouts 94 allow the rear flange 62 to flex easier during installation of the nut 20.

Figure 10:
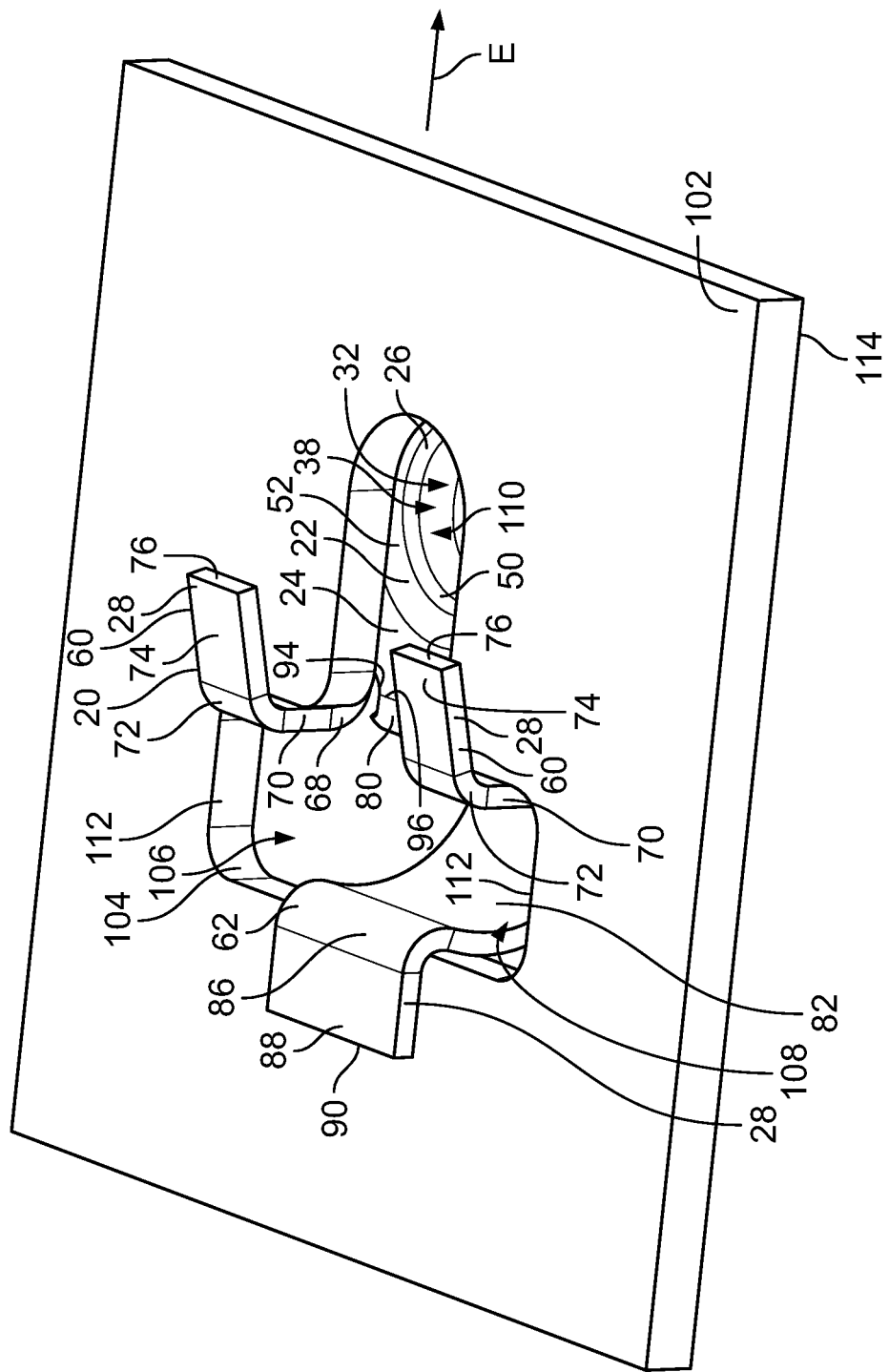
FIG. 10 is a top isometric view of the nut of FIG. 1 fully installed in the first component.
Figure 11:
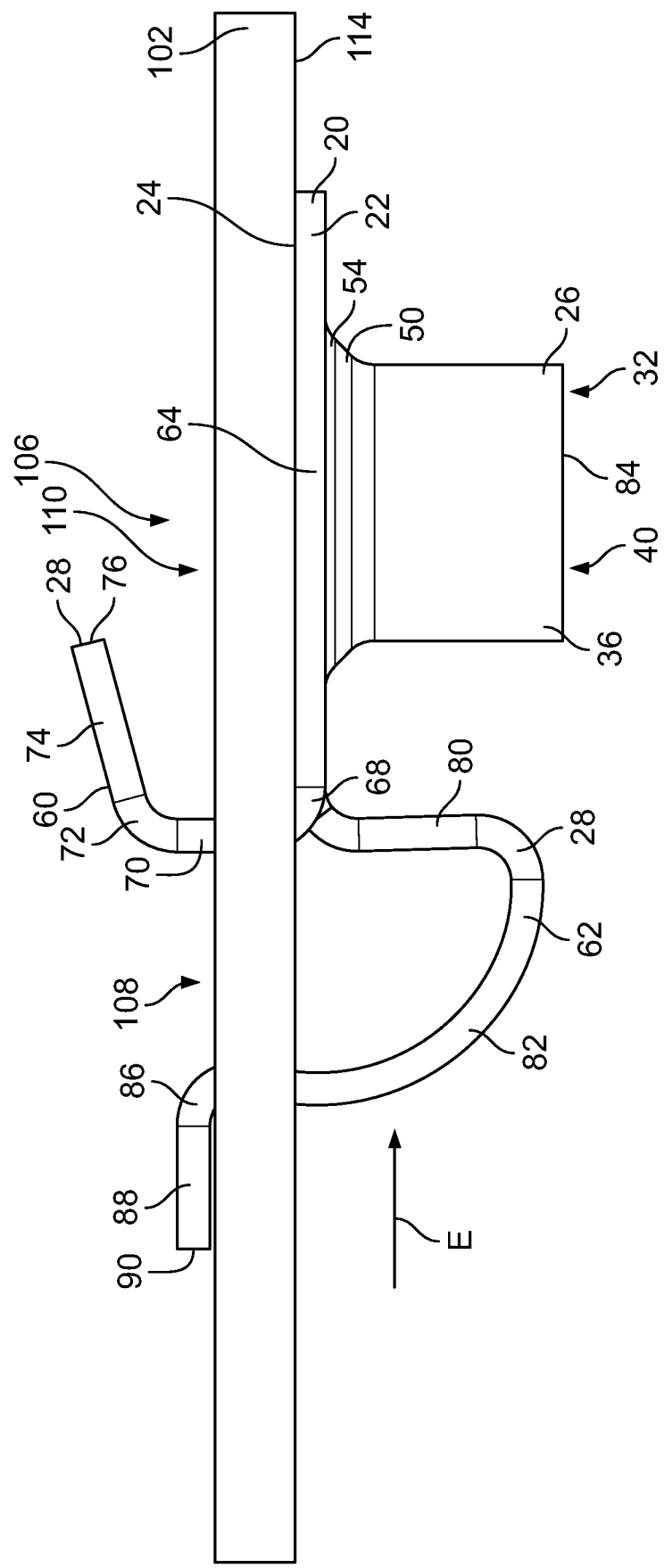
FIG. 11 is a right side view of the nut of FIG. 10 fully installed in the first component.

Referring to FIGS. 10 and 11, the nut 20 is shown in a fully installed position with the base 22 being generally flush with a bottom side 114 of the first component 102. As such, the nut 20 is in a horizontal position, parallel to the first component 102. In such a position, the front flanges 60 are positioned adjacent to the internal edges 104 of the lateral segment 108, and the vertical wall 70 of the front flanges 60 may be in contact with the first component 102 (see FIG. 10). Depending on the thickness of the first component 102, the second curved wall 72 of the front flanges 60 may be flexed to accommodate the increased thickness. As a result, the angled wall 74 may be rotated or flexed to accommodate the first component's 102 thickness. As illustrated in FIG. 10, the first arched wall 82 of the rear flange 62 is positioned against the internal edges 104 of the lateral segment 108. As discussed in further details below, the first arched wall 82 is designed to flex or push the nut 20 forward such that the nut 20 can be sustained in a locked position.

Once installed in the position of FIGS. 10 and 11, the first arched wall 82 acts to push the nut 20 in the direction of arrows E. As such, this force may push the vertical walls 70 of the front flanges 60 against the internal edges 104 of the lateral segment 108. Once the vertical walls 70 of the front flanges 60 are in contact with the internal edges 104 of the lateral segment 108, the flanges 28 of the nut 20 each comprise a point of contact with the first component 102 such that the nut 20 may be secured thereto. In some embodiments, the vertical walls 70 of the front flanges 60 may not be in contact with the internal edges 104 of the aperture 106.

Figure 12:
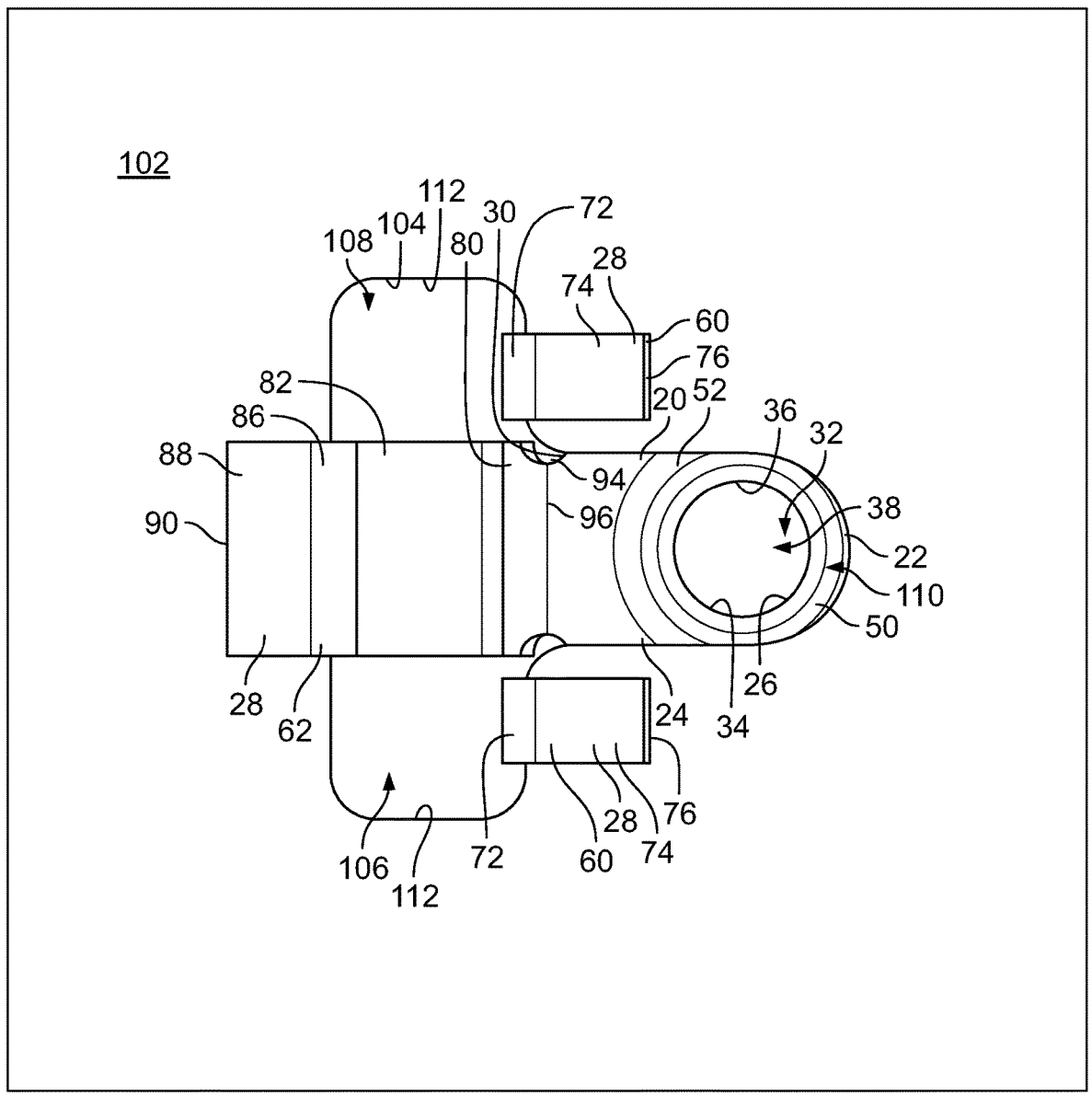
FIG. 12 is a top plan view of the nut of FIG. 10 fully installed in the first component.

Referring now to FIG. 12, a top plan view of the nut 20 installed to the first component 102 is shown. As illustrated in FIG. 12, the nut is configured to securely fasten to the bottom side 114 of the first component 102 (see FIG. 11)

through the single aperture 106 when the bottom side 114 of the first component 102 is restricted or inaccessible. Once the nut 20 is installed into the first component 102, the hole 32 of the sleeve 26 is aligned with the elongated slot 110 of the aperture 106, such that a fastener 150 (see FIG. 13) may be inserted therethrough.

Figure 13:
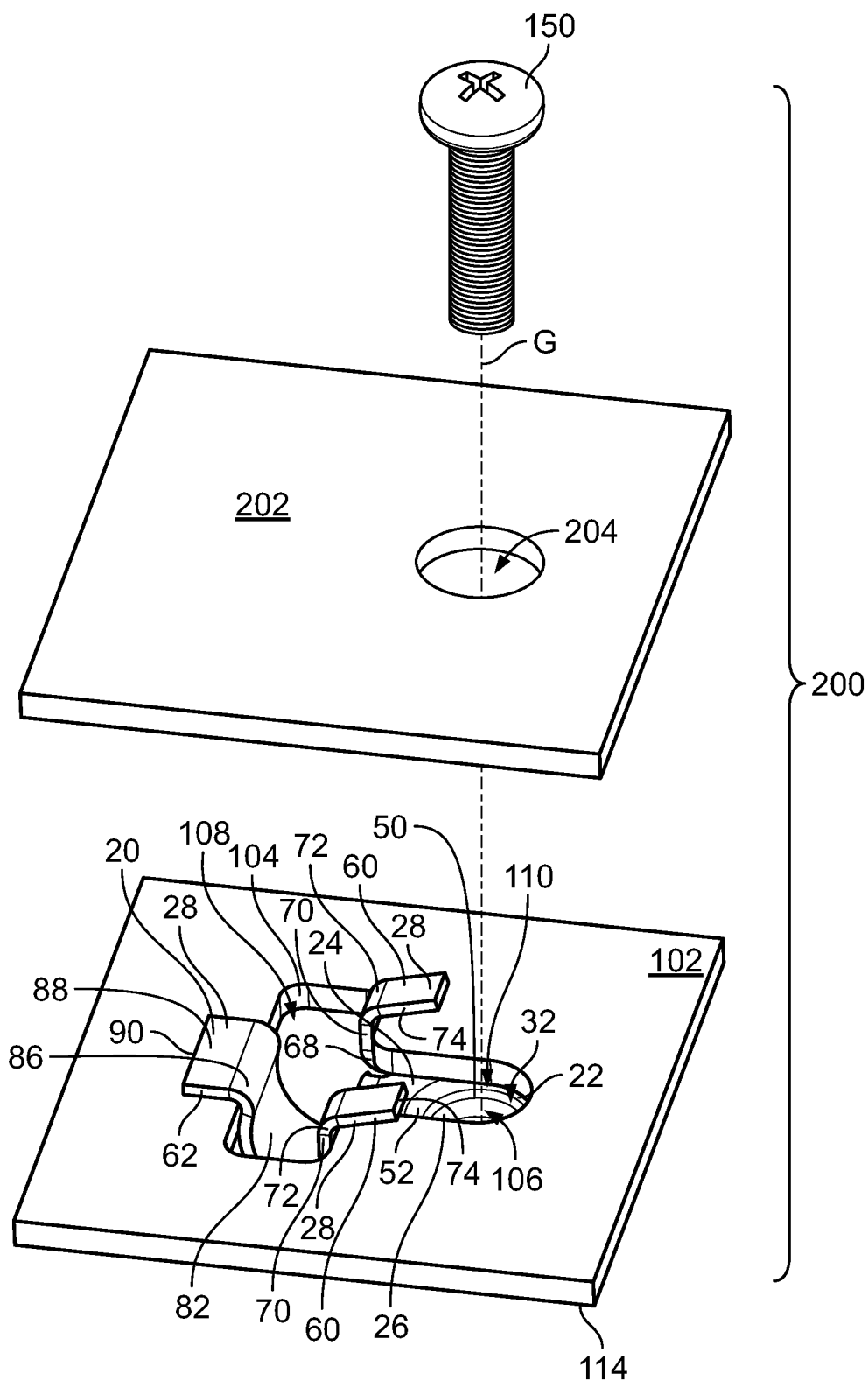
FIG. 13 is an exploded view of a fastening system.

Referring to FIG. 13, an exploded view of a fastening system 200 is shown. As illustrated in FIG. 13, during a fastening operation, a second component 202 comprising a rounded aperture 204 may be placed over the first component 102 once the nut 20 is attached to the first component 102. In alternative embodiments, the rounded aperture 204 may comprise any shape and may not be rounded. Once the first component 102 and the second component 202 are aligned on top of each other, the fastener 150 may then align with the threading in the sleeve 26 of the nut 20 to fasten the first component 102 to the second component 202. Upon continued fastening, the angled wall 74 of the front flanges 60 may flex to a flat position such that the angled wall 74 and portions of the second curved wall 72 may be generally flush to the first component 102 and the second component 202. Further, the finger 88 and the rear flange 62 may also flex to a flat position such that the finger 88 and portions of the second arched wall 86 of the rear flange 62 may also be flush to the first component 102 and the second component 202. As noted herein, the nut 20, the first component 102, the second component 202, and the fastener 150 comprise the fastening system 200.

Referring still to FIG. 13, the fastener 150, the second component 202, the first component 102, and the nut 20 are all aligned along an axis G such that the fastener 150 can fasten the first component 102 to the second component 202. Put differently, the rounded aperture 204 of the second component 202, the aperture 106 of the first component 102, and the hole 32 of the sleeve 26 are aligned such that the fastener 150 may extend therethrough.

During fastening of the first component 102 to the second component 202, the cone draw configuration of the chamfered edge 50 gives the nut 20 strength by creating a larger footprint on the first component 102 in order to pull the load bearing over it. Additionally, the cone draw configuration of the chamfered edge 50 acts as a lead in edge for the fastener 150, such that the user may be able to quickly find the hole 32 of the sleeve 26. Once the fastener 150 has been tightened through the sleeve 26 of the nut 20, the first component 102 and the second component 202 are securely attached (see FIG. 14). As noted herein, the fastener 150 may comprise any type of fastener or screw. Further, it is contemplated that the second component 202 may comprise any thickness or configuration. Furthermore, the second component 202 can be any shape, may be larger or smaller than shown, and may comprise any type of panel, such as a plastic panel, an aluminum panel, or a metal panel, for example.

Figure 14:
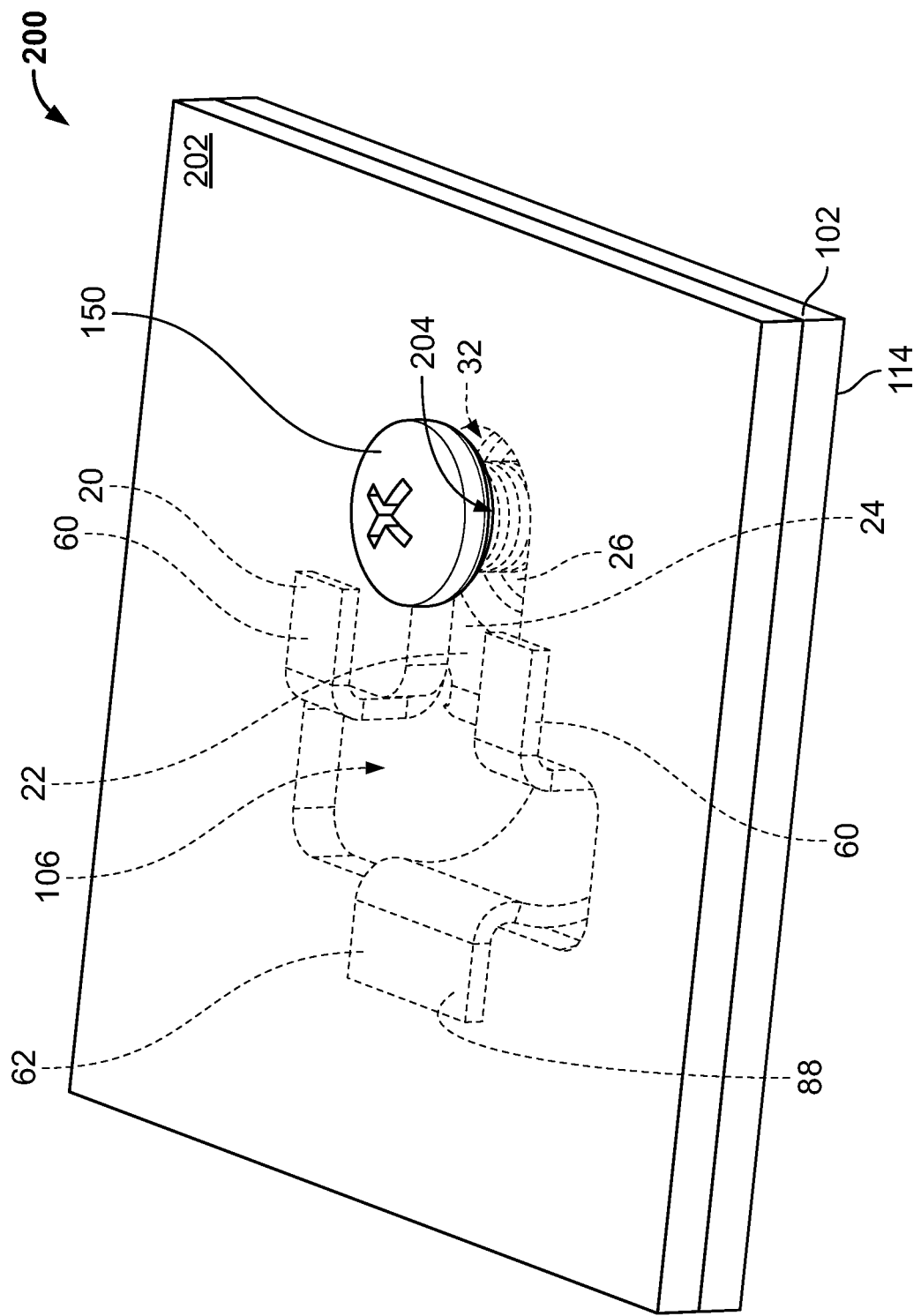
FIG. 14 is a top isometric view of the fastening system of FIG. 13.

Referring to FIG. 14, the fastening system 200 is shown in an installed position. As illustrated in FIG. 14, the first component 102 and the second component 202 are fastened to each other by the fastener 150 and the nut 20 (shown in dashed lines in FIG. 14). As discussed above, the rounded aperture 204 of the second component 202, the aperture 106 of the first component 102, and the hole 32 of the sleeve 26 are aligned in the installed position (see FIG. 13). As illustrated in FIGS. 13 and 14, the fastener 150 is configured to extend through the first component 102, the second component 202, and a portion of the sleeve 26 of the nut 20.

After operational use, the nut 20 may also be configured to be removable from the first component 102. In such an embodiment, once the fastener 150 and the second component 202 are removed, the finger 88 of the rear flange 62 may be grasped or lifted by the user. Once the finger 88 of the rear flange 62 is lifted, the nut 20 may be pushed and rotated in opposite directions as described above with respect to installation to be removed from the first component 102. Once the nut 20 is removed from the first component 102, the nut 20 can be reused again, offering savings to the user.

As described above, the nut 20 allows two or more components 102, 202 to be fastened together when access to the bottom surface of the first component 102 is restricted or inaccessible. Further, the nut 20 may be used with only a single aperture, as described above with respect to the aperture 106, which is punched or otherwise formed in the first component 102. As a result, the user does not need to machine multiple holes into the first component 102 when access to the bottom side 114 of the first component 102 is restricted or inaccessible. This results in an efficient process that allows the nut 20 to be quickly installed using only one side of the first component 102. As noted herein, it is contemplated that the nut 20 can also be used when access to the bottom side 114 of the first component 102 is accessible.

While various spatial and directional terms, such as top, bottom, lower, mid, lateral, horizontal, vertical, front, rear, and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain how to practice the disclosure and will enable others skilled in the art to utilize the disclosure. The claims are to be construed to include alternative embodiments to the extent permitted by the prior art.

As noted previously, it will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto.

I claim:
1. A sheet metal nut, comprising:
a base including a flat planar surface;
a sleeve extending below the base, wherein the sleeve comprises an inner surface;
two front flanges positioned on side edges of the base and extending to a position directly above the flat planar surface of the base, wherein the two front flanges extend from a rear edge of the base; and
a rear flange extending away from the rear edge of the base,
wherein a first portion of the rear flange extends below a plane of the flat planar surface of the base, and wherein a second portion of the rear flange extends above the plane of the flat planar surface of the base, and wherein the sheet metal nut is configured to securely fasten to a bottom side of a component through a single aperture when the bottom side of the component is restricted or inaccessible.

2. The sheet metal nut of claim 1, wherein the rear flange is positioned between the two front flanges.

3. The sheet metal nut of claim 1, wherein the two front flanges are identical.

4. The sheet metal nut of claim 1, wherein the two front flanges and the rear flange are capable of deflecting.

5. The sheet metal nut of claim 1, wherein the sleeve comprises a hole extending therethrough.

6. The sheet metal nut of claim 5, wherein the sleeve further comprises a chamfered edge that extends near the flat planar surface.

7. The sheet metal nut of claim 1, wherein the rear flange is wider than each of the two front flanges.

8. A fastening system, comprising:
a sheet metal nut, including:
  a base including a flat planar surface;
  a sleeve extending downwardly from a center portion of the base, wherein the sleeve comprises a hole extending therethrough;
  at least one front flange extending from a rear edge of the base, wherein the at least one front flange extends to a position over the flat planar surface of the base; and
  a rear flange extending from the rear edge of the base, wherein a portion of the rear flange extends below the flat planar surface of the base; and
a first component comprising an aperture extending through the first component, wherein the aperture is T-shaped,
wherein the sheet metal nut is configured to securely fasten to a bottom side of the first component through the aperture when the bottom side of the first component is restricted or inaccessible.

9. The fastening system of claim 8, wherein the at least one front flange and the rear flange comprise a point of contact with the first component in an installed position.

10. The fastening system of claim 8, wherein the fastening system further comprises a second component that includes a rounded aperture, wherein the second component is placed over the first component.

11. The fastening system of claim 10, wherein the rounded aperture of the second component, the aperture of the first component, and the hole of the sleeve are aligned in an installed position.

12. The fastening system of claim 10, wherein the fastening system further comprises a fastener.

13. The fastening system of claim 12, wherein the fastener is configured to extend through the first component, the second component, and a portion of the sleeve.

* * * * *